United States Patent [19]
George et al.

[11] Patent Number: 6,000,242
[45] Date of Patent: Dec. 14, 1999

[54] APPARATUS FOR AND PROCESS OF WATER GRANULATING MATTE OR SLAG

[75] Inventors: David B. George, Salt Lake City; Jesus A. Sepulveda; Anthony J. Weddick, both of Sandy, all of Utah; Anthony G. Storey, Pueblo Nuevo, Peru; David Arana, Tucson, Ariz.

[73] Assignee: Kennecott Holdings Corporation, Magna, Utah

[21] Appl. No.: 08/866,484

[22] Filed: May 30, 1997

Related U.S. Application Data

[60] Provisional application No. 60/018,729, May 31, 1996.

[51] Int. Cl.$^6$ .......................... C03B 19/00; C03B 37/00; B29B 9/00
[52] U.S. Cl. .................. 65/19; 65/21.2; 65/141; 65/142; 75/331; 241/15; 241/31; 241/39; 264/5; 425/7
[58] Field of Search .............................. 65/19, 21.2, 141, 65/142; 425/7; 264/5; 75/331, 640; 241/15, 31, 38, 39

[56] References Cited

U.S. PATENT DOCUMENTS

| | | |
|---|---|---|
| 2,159,433 | 5/1939 | Ervin . |
| 2,286,078 | 6/1942 | Gallai-Hatchard . |
| 2,384,892 | 9/1945 | Comstock . |
| 3,615,329 | 10/1971 | Jones ............................................ 65/141 |
| 4,204,855 | 5/1980 | Monteyne . |
| 4,230,477 | 10/1980 | Sharonov et al. . |
| 4,416,690 | 11/1983 | Richards et al. .............................. 75/26 |
| 4,461,636 | 7/1984 | Gagneraud et al. . |
| 4,494,971 | 1/1985 | Monteyne et al. ........................... 65/19 |
| 4,909,821 | 3/1990 | Olginsky et al. ........................... 65/141 |
| 4,909,837 | 3/1990 | Hansen et al. ............................... 75/24 |
| 4,995,894 | 2/1991 | Spencer et al. . |
| 5,007,959 | 4/1991 | Reist et al. ................................. 75/645 |
| 5,215,571 | 6/1993 | Marcuson et al. ......................... 75/626 |
| 5,217,427 | 6/1993 | Cullis ........................................ 494/45 |
| 5,409,521 | 4/1995 | Featherstone et al. .................... 75/334 |
| 5,441,205 | 8/1995 | Kanazumi et al. ........................ 241/41 |
| 5,449,395 | 9/1995 | George ...................................... 75/586 |
| 5,468,279 | 11/1995 | Yamashiro ................................. 75/640 |

FOREIGN PATENT DOCUMENTS

| | | |
|---|---|---|
| 0 082 279 A1 | 6/1983 | European Pat. Off. . |
| 2 284 677 | 4/1976 | France . |
| 4-302993 | 10/1992 | Japan . |
| 4-302994 | 10/1992 | Japan . |

*Primary Examiner*—Steven P. Griffin
*Attorney, Agent, or Firm*—Whyte Hirschboeck Dudek SC

[57] ABSTRACT

Molten matte or slag is water granulated by feeding molten matte or slag through a launder to a granulator tank. The tank includes sloping walls and is equipped with adjustable overflow weirs and one or more of spray nozzles. These nozzles are positioned such that the water that they emit impacts on substantially all of the molten matte or slag that is fed to the granulator tank. The granulation tank is optionally coated with a polymeric material to reduce the potential for phreatic explosions. The granulator is also optionally equipped with a gas offtake which can be connected directly to a quench tower which in turn can be connected to an induced ventilation system.

9 Claims, 3 Drawing Sheets

APPARATUS FOR AND PROCESS OF WATER GRANULATING MATTE OR SLAG

This application claims the benefit of U.S. Provisional Application No. 60/018,729, filed May 31, 1996.

BACKGROUND OF THE INVENTION

This invention relates to water granulation. In one aspect, this invention relates to an apparatus useful for the water granulation of molten matte or slag while in another aspect, this invention relates to a method of water granulating matte or slag. In yet another aspect this invention relates to an apparatus and method of water granulating matte or slag in an environmentally safe manner and with minimal, if any, phreatic explosions.

In the various pyrometallurgical processes, particularly nonferrous processes, molten matte and slag are generated as intermediate product and by-product, respectively. Efficient handling of these materials favors their reduction to a flowabie, particulate state. Many methods are known for making this reduction, and these include water granulation, air granulation, grinding, rotary atomization (as described in U.S. Pat. No. 5,409,521 which is incorporated herein by reference) and the like. For reasons of convenience, safety and cost, water granulation is often a preferred method of size reducing matte and slag. One representative water granulation method is described in U.S. Pat. No. 5,468,279 which is incorporated herein by reference.

While all of the above techniques are effective to one degree or another, all are subject to improvement, particularly with respect to environmental and safety considerations. With respect to water granulation in particular, improvements in gas emission capture and reduction in phreatic explosions are the targets of a constant quest.

SUMMARY OF THE INVENTION

According to this invention, molten matte or slag is water granulated by feeding molten matte or slag through a launder to a granulator tank. The tank comprises sloping walls, and it is equipped with one or more baffles which divides it into an active granulation zone and a quiescent settling zone. The tank is also equipped with adjustable overflow weirs and a multiplicity of spray nozzles. These nozzles are positioned such that the water that they emit impacts on all or substantially all of the molten matte or slag that is fed to the granulator tank. The granulation tank is optionally coated with a polymeric material to reduce the potential for phreatic explosions. The granulator is also optionally equipped with a gas offtake which can be connected directly to a quench tower which in turn can be connected to an induced ventilation system.

The granulator tank is also equipped with a bucket elevator for removing granulated material. Water overflow from the granulator is transferred to a thickener/clarifier to recover solids. The recovered granulation water from the thickener/clarifier is cooled and recycled, and the pH of this water is controlled to maximize the efficiency of removing pollutants from the granulator ventilation gas.

BRIEF DESCRIPTION THE DRAWINGS

DESCRIPTION OF THE PREFERRED EMBODIMENT

The water granulation apparatus of this invention is capable of granulating either molten matte or slag or a combination of both. Typical matte and slag compositions include those generated in copper smelting processes as those described in U.S. Pat. Nos. 5,449,395; 4,416,690; 5,217,427 and 5,007,959, all of which are incorporated herein by reference. Representative mattes and slags generated from a nickel smelting process are described in U.S. Pat. No. 5,215,571 which is also incorporated herein by reference.

Like numerals are employed to designate like parts throughout the drawings. Various items of equipment, such as valves, fittings, heaters and the like, are omitted so as to simplify the description of the invention but those skilled in the art will recognize that such conventional equipment can be, and is, employed as desired.

Figure 1:
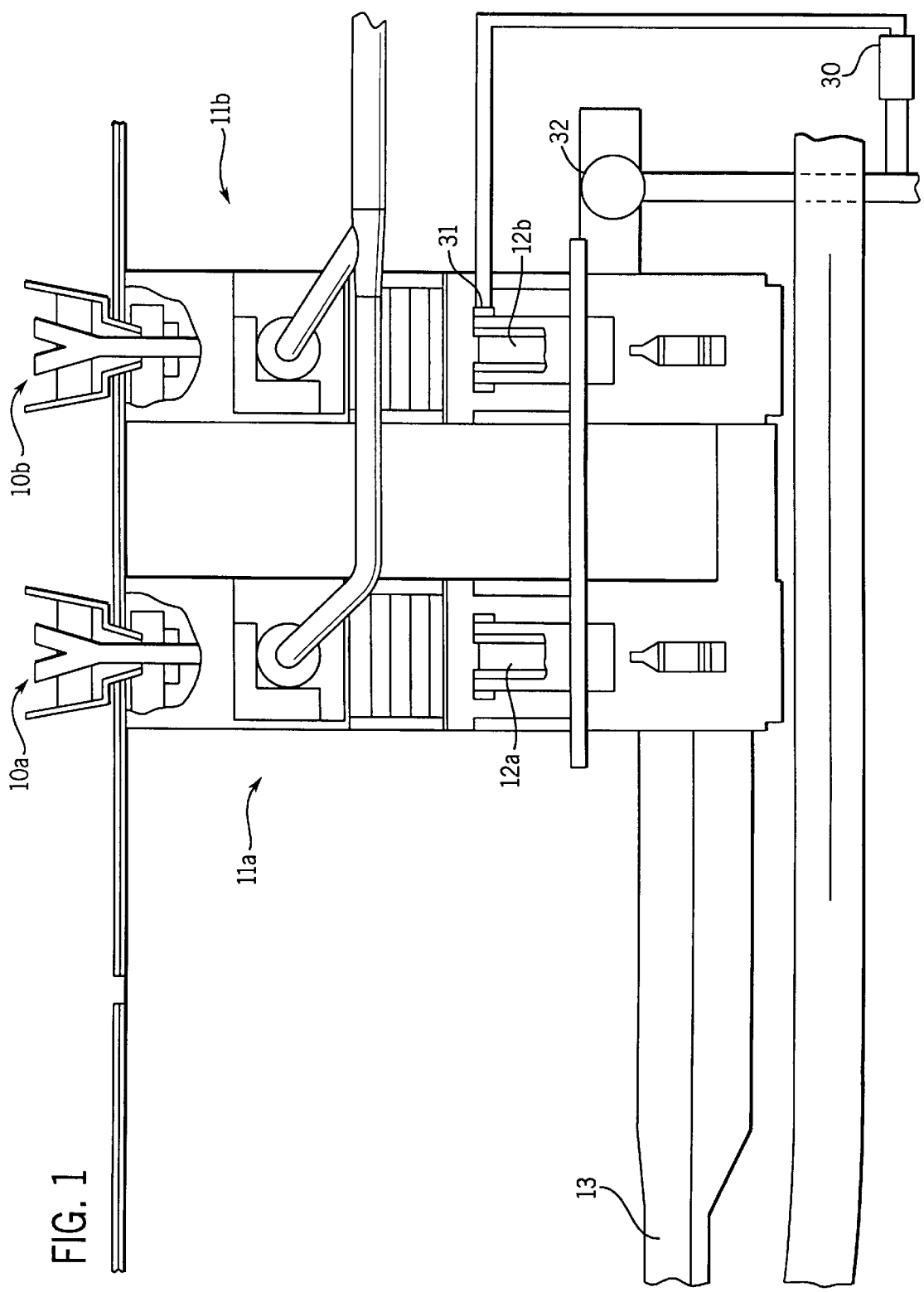
FIG. 1 is a schematic flow diagram of one embodiment of a matte granulation process from matte launders to two granulators to a granulated matte conveyor belt.

One typical embodiment of the process of this invention is depicted in FIG. 1. Molten matte (e.g. copper or nickel) or slag, in this case matte, is conveyed by launders 10a and 10b from one or more smelters or other pyrometallurgical furnaces (not shown) to granulation tanks 11a and 11b. The molten matte is contacted with water within these tanks, and it is converted to granulated matte which collects at the bottom of the tanks. Bucket excavators 12a and 12b remove the granulated matte on a continuous or batch basis from the bottom of the granulation tanks to conveyor 13 or similar transport equipment which transports the granulated matte to a storage or shipping facility or to another station for further processing (none of which are shown in the Figures).

Figure 2:
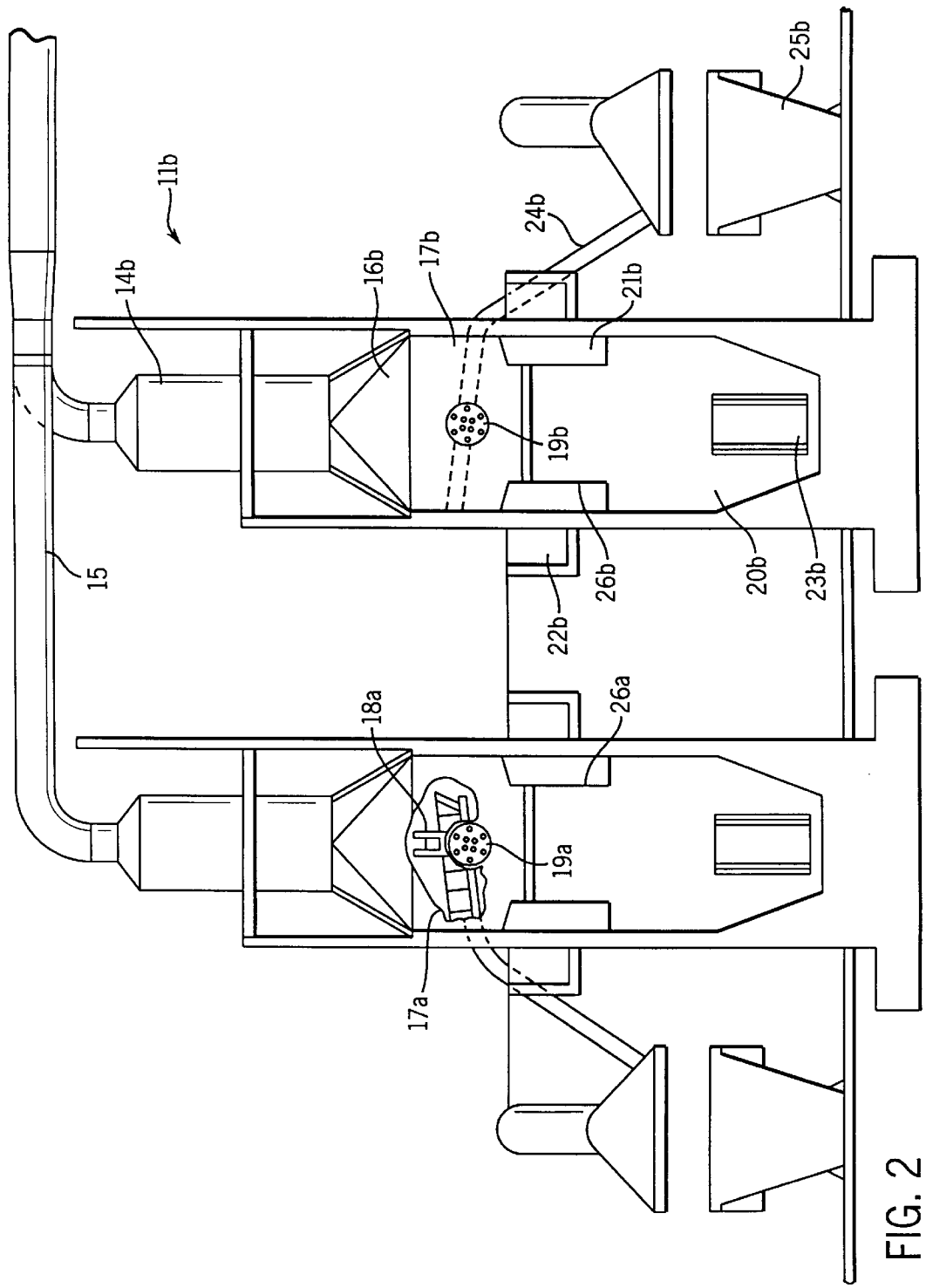
FIG. 2 is a schematic depiction of the two granulators of FIG. 1.

FIG. 2 depicts one embodiment of the granulator of this invention. Typically the granulator (here described in terms of granulator 11b) includes an enclosed and ventilated tower 14b connected to a ventilation duct 15. Tower 14b is joined to steam hood 16b which covers granulation zone 17b. The granulation zone is equipped with an intermediate ladle (e.g. ladle 18a shown in the cutaway section of granulation zone 17a) positioned relative to one or more water nozzles (e.g. 19a and 19b) such that molten matte discharged from the intermediate ladle (which was received from launder 10a or 10b, respectively) comes into immediate and substantially complete contact with water discharged from the nozzles.

The contact of molten matte with water generates steam which is captured by the steam hood and vented through the tower to the ventilation duct. Typically and preferably, the intermediate ladle is located above the nozzle, and the nozzle is operated in such a manner that it ejects a spray or cascade of water. The molten matte discharged from the ladle thus passes or falls through the water spray or cascade.

Upon contact with water, the molten matte is granulated and collected at the bottom of the granulation tank, i.e. in settling zone 20b. Granulation zone 17b is separated from settling zone 20b by baffle 21b which is typically one or more concrete or steel structures extending from the inner walls of the granulation tank. Settling zone 20b is also equipped with granulation water overflow weir 22b which will capture and divert from the settling zone the granulation water. The granulated matte is eventually removed from the settling zone by excavation buckets 23b which are depicted in greater detail in FIG. 3.

The granulation tank is also equipped with provisions (e.g. emergency launder 24b and emergency pot 25b) to control and direct any molten material spills that may occur on occasion away from the granulation area.

Figure 3:
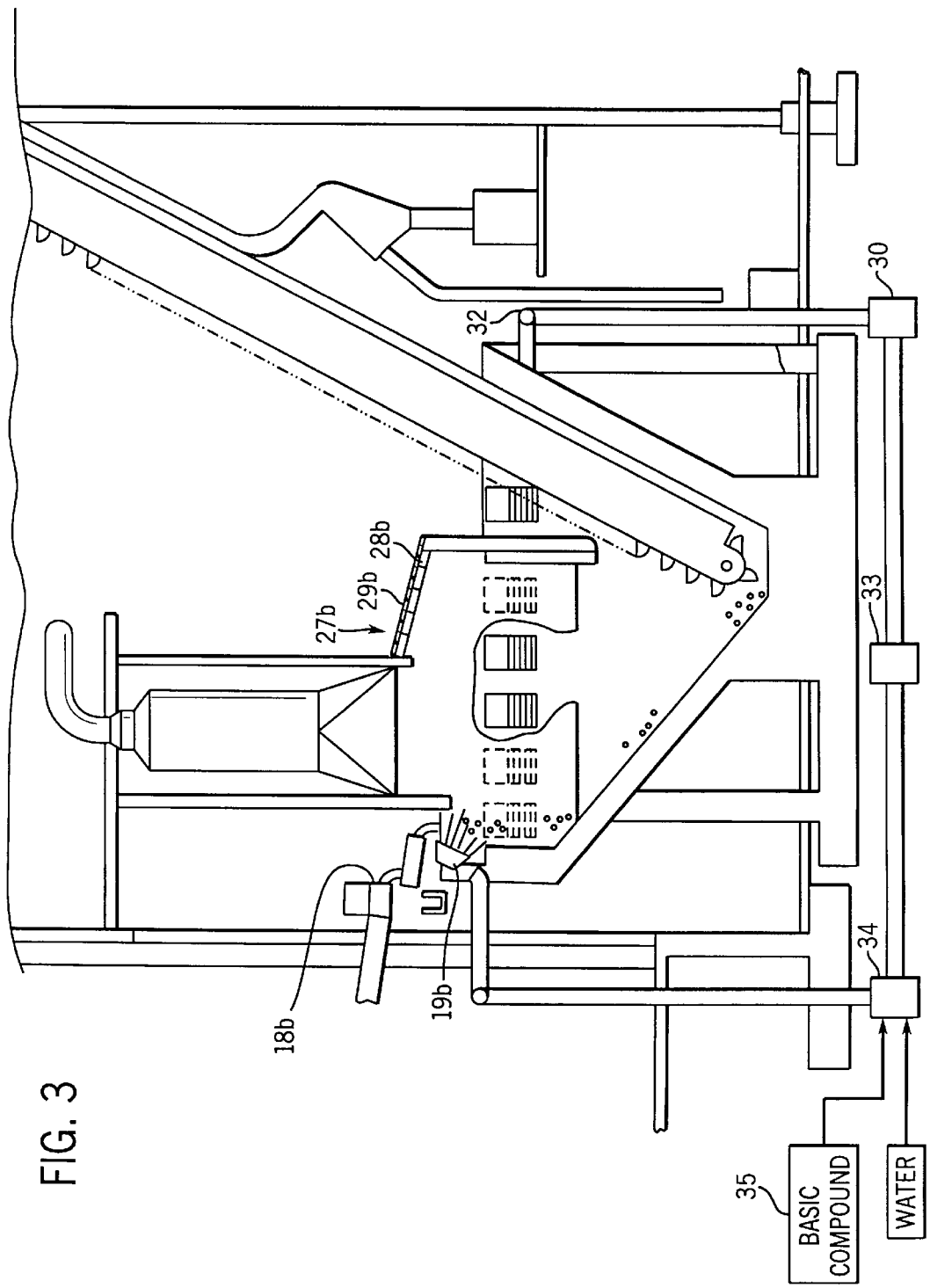
FIG. 3 is a schematic depiction of the bucket excavator of FIGS. 1 and 2.

The granulator tank consists of reinforced concrete or other suitable construction material, e.g. steel, and comprises sloping walls (as depicted in FIG. 3) to direct the granulated material to the bucket elevator. The overflow weirs are located along the side of the tank to allow controlled withdrawal of water, and preferably these weirs are adjustable. The weirs are isolated from the free-board in the granulator and the turbulent water by metal partitions 26a and b which extend into the water as shown in FIG. 2.

In one embodiment, water enters the granulation pit or tank through a plate (not shown), typically made of stainless steel, which is fitted with a multiplicity of spray nozzles. The number, diameter (size) and positioning of the nozzles can vary to convenience, the exact size, number and positioning of the nozzles a function of the molten material, the parameters of the granulating operation, the desired final particle size of the granulated product, and similar factors. The combination of all these factors ultimately determines the number and size of phreatic explosions.

Optionally, the granulation pit is coated with a polymeric material, e.g. a coal tar epoxy, to reduce the potential for molten material explosions. While not wanting to be bound by theory, organic materials are believed to prevent metal-water explosions by interfering with the onset of nucleate boiling at the interface between the molten material and the granulation tank.

The water flow rate to the granulator tank will vary with the design of the tank, the nature and amount of molten material, water temperature and other variables, but typically varies between about 30 and about 10 tons of water per ton of material, preferably between about 25 and 15 tons water per ton of material. Depending upon the various design and operating variables of the water granulation system, typical systems can routinely process 60 tons per hour (tph) of molten material, e.g. copper matte, often in excess of 85 tph, and some system designs and operations can process in excess of 200, even 300, tph molten material without damaging explosions.

Water pressure is typically between about 65 and 120 psig, preferably between about 85 and 105 psig, to promote explosion-free granulation. Some small "bangs" are typical and useful to assure the operators that the system is operating normally. The water temperature is typically in excess or 90 F., preferably between about 120 to 140 F.

Preferably, the granulators are fitted with an explosion relief opening 27b consisting of durable, e.g. stainless steel, channels 28b set at a spacing to reduce the possibility of solid material being expelled from the granulation area to the molten material inlet launder. Here too, preferably the explosion relief opening is covered with a polymeric material 29b, e.g. a polymer coated fabric, and retained by elastic cords to prevent release of steam during normal operation but allowing relief of pressurized gases in the event of an explosion (thus preventing structural damage to the granulator tank and associated equipment).

The granulator is preferably equipped with a gas offtake which connects directly to quench tower (scrubber) 14b and then to an induced ventilation system (e.g. ventilation duct 15). The quench tower can be operated with a side-stream of the main granulation water to effect the scrubbing of pollutants such as sulfur dioxide or particulate matter. The quench tower effluent can flow directly into the granulation tank. Alternatively the granulator can be ventilated through a remotely located scrubber (not shown). In another alternative, the granulator can be tightly sealed to prevent any gas escape with the exception of gases into the ventilated launder enclosure.

The bucket elevator is used to remove material from the granulation tank, and it is equipped with rollers, guides and a lifting hoist so it can be partially removed from the granulation tank for servicing or to effect a controlled removal of material from the tank. This latter procedure allows the tank to be "mined" should it be overfilled with granulated material.

The water overflow from the granulator 32 is directed to a thickener/clarifier (30) to recover any solids that are entrained in the granulation water. The underflow from the thickener can optionally be fed into slotted granulation excavator buckets to effect filtration and recovery of the material 31. Alternatively, the underflow can be directed to a filtration apparatus.

The granulation water pH is controlled 34 by addition of a basic compound 35, such as NaOH, to maintain the pH at about neutral to slightly basic. In one embodiment, the controlled pH water is used to scrub pollutants from the granulator ventilation gas.

The granulation water can be cooled in a conventional cooling tower 33, and then recycled to the granulation system. Preferably, a backup water supply system is provided to assure water flow to the granulation heads even in the event of an electrical power failure that shuts down the main granulation pumps.

Although this invention has been described in considerable detail by reference to the drawings and the various embodiments detailed above, this description is for the purpose of illustration and is not to be construed as a limitation upon the invention as described in the appended claims.

What is claimed is:

1. An apparatus for granulating molten material, the apparatus comprising:
   A. means for conveying a molten material from a source of molten material to a sloping wall granulator tank having a freeboard area, the granulator tank equipped with (i) water overflow weirs, the weirs isolated from the freeboard area by at least one partition that extends into the granulator tank, (ii) a baffle to divide the granulator tank into a settling zone and a granulation zone, (iii) means for diverting material spills away from the granulation zone, and (iv) means to impede a discharge of solid material from the granulator tank to the means for conveying;
   B. means for projecting water onto the molten material as the molten material is discharged from the means for conveying into the granulation zone of the granulator tank such that the molten material is converted into a granulated material and then collects in the settling zone of the granulator tank;
   C. means for removing the granulated material from the settling zone of the granulator tank; and
   D. means for capturing gas emissions from the granulator tank.

2. The apparatus of claim 1 further comprising means for recycling the projected water from the granulator tank.

3. The apparatus of claim 2 wherein the means for recycling the projected water comprises a thickener/clarifier to remove suspended material.

4. The apparatus of claim 1 further comprising means for controlling the pH of the projected water to neutral or slightly basic.

5. The apparatus of claim 1 wherein the means for removing the granulated material comprises a bucket elevator, the bucket elevator being adjustably positioned in relation to the bottom of the granulator tank.

6. The apparatus of claim 1 wherein the granulator tank is coated with a polymeric material.

7. The apparatus of claim 1 wherein the weirs are adjustably positioned in the granulator tank.

8. A method of granulating a molten material, the method comprising the step of:
   A. feeding a molten material into a granulation zone of a granulator tank;
   B. contacting the molten material with sufficient water, the water being pH controlled to neutral or slightly basic, and in such a manner in the granulation zone such that the molten material is converted into granulated material with only phreatic explosions that are not damaging to the granulator tank;
   C. collecting the granulated material in a settling zone of the granulator tank;
   D. collecting gas emissions from the granulator tank, and converting such emissions to a form suitable for discharge to the environment;
   E. recovering the water from step (B) from the granulated material, converting the recovered water to a form suitable for use in step (B), and recycling the recovered water to step (B);
   F. removing the granulated material from the settling zone of the granulator tank with an adjustably positioned removal means; and
   G. diverting spills of the molten material away from the granulation zone of the granulator tank.

9. An apparatus for granulating molten material, the apparatus comprising:
   A. means for conveying a molten material from a source of molten material to a sloping wall granulator tank having a freeboard area, the granulator tank equipped with (i) water overflow weirs, the weirs isolated from the freeboard area by at least one partition that extends into the granulator tank, the weirs are adjustably positioned in the granulator tank, (ii) a baffle to divide the granulator tank into a settling zone and a granulation zone, (iii) a polymeric coating, (iv) means for diverting material spills away from the granulation zone, and (v) means to impede a discharge of solid material from the granulator tank to the means for conveying;
   B. means for projecting pH neutral or slightly basic water onto the molten material as the molten material is discharged from the means for conveying into the granulation zone of the granulator tank such that the molten material is converted into a granulated material and then collects in the settling zone of the granulator tank;
   C. means for removing the granulated material from the settling zone of the granulator tank comprising a bucket elevator, the bucket elevator being adjustably positioned in relation to the bottom of the granulator tank;
   D. means for capturing gas emissions from the granulator tank; and
   E. means for recycling the water from the granulator tank back to the means for projecting.

* * * * *